United States Patent [19]
Sellers

[11] Patent Number: 5,539,615
[45] Date of Patent: Jul. 23, 1996

[54] NOTEBOOK COMPUTER KEYBOARD WITH SLOT-SUPPORTED SLIDING PIN TILT MECHANISM

[75] Inventor: Charles A. Sellers, Houston, Tex.

[73] Assignee: Compaq Computer Corporation, Houston, Tex.

[21] Appl. No.: 260,706

[22] Filed: Jun. 16, 1994

[51] Int. Cl.[6] .............................. G06F 1/16; B41J 11/56; H05K 5/02
[52] U.S. Cl. .......................................... 361/680; 400/682
[58] Field of Search .......................... 364/708.1; 341/22; 400/488, 489, 682; 235/145 R, 146; 361/680

[56] References Cited

U.S. PATENT DOCUMENTS 5,198,991  3/1993  Pollitt ........................................ 361/680

FOREIGN PATENT DOCUMENTS 6-12148  1/1994  Japan ................................. G06F 1/16

OTHER PUBLICATIONS

IBM Technical Disclosure Bulletin, vol. 29, No. 8, Jan. 1987, pp. 3491 and 3492, "Access Method for Feature Expansion".

1992 Damark Catalog Sheet Illustrating Laptop Computer.

*Primary Examiner*—Michael W. Phillips
*Attorney, Agent, or Firm*—Konneker & Smith

[57] ABSTRACT

A keyboard structure is supported on the top side of a base housing portion of a compact portable computer such as a notebook or laptop computer. In one keyboard embodiment pins on the keyboard are slidably received in slots on upstanding support brackets on the base housing, and in another keyboard embodiment the keyboard is movably secured to the base housing by pivotable support bars. When the lid portion of the computer is opened, the keyboard is in a storage/transport orientation in which it is generally parallel to the bottom wall of the base housing. With the lid portion opened, and the computer resting on a horizontal support surface, the keyboard may be used in this storage/transport orientation. The keyboard is supported on the base housing in a manner also permitting the keyboard to be moved forwardly relative to the base housing and be downwardly pivoted to a forwardly and downwardly sloped tilted use orientation in which the keyboard is disposed generally forwardly of the base housing, with a lower front edge portion of the keyboard downwardly engaging the support surface upon which the computer rests. In this manner, the notebook computer keyboard is disposed at an angle and elevation emulating the use orientation of a separate desktop computer keyboard.

6 Claims, 2 Drawing Sheets

NOTEBOOK COMPUTER KEYBOARD WITH SLOT-SUPPORTED SLIDING PIN TILT MECHANISM

BACKGROUND OF THE INVENTION

1. Field of the Invention

The present invention relates generally to computer apparatus, and more particularly relates to the keyboard portions of compact portable computers such as laptop and notebook computers.

2. Description of Related Art

The housing of the separate keyboard portion of a conventional desktop computer is typically configured in a manner such that when its bottom side is rested on a generally horizontal support surface the top side of the keyboard slopes forwardly and downwardly toward the user of the computer. This top side slope positions each rearwardly successive key row at a slightly higher elevation than that of the preceding key row to thereby ergonomically improve user hand and wrist orientation during keyboard use. The conventional provision of recessed, downwardly pivotable support legs on rear underside portions of the keyboard housing allows the desktop computer user to further increase the angle of forward and downward keyboard tilt as typing hand comfort dictates.

Compact portable computers, such as laptop and notebook computers, typically comprise a thin, open-topped rectangular base housing along the back side of which a thin rectangular lid housing is secured for pivotal movement, notebook-like, between a closed storage and transport orientation in which the lid extends across and covers the top side of the base housing, and an open use position in which the lid housing projects upwardly from the base housing.

With the lid housing open, and the bottom side of the base housing resting on a suitable horizontal support surface, a monitor screen carried on the inner side surface of the lid housing faces the computer user. The keyboard structure is anchored within the base housing, with the exposed tops of the keys lying in an essentially horizontal plane parallel to the bottom side surface of the base housing. This, of course, is the typing use orientation of the keyboard—an orientation decidedly less comfortable for the user of the computer than the sloping use orientation available in the separate keyboard structures of desktop computers.

In this typing orientation, the essentially horizontal portable computer keyboard is elevated above the support surface upon which the computer rests a distance of approximately one to two inches. As is well known, extended typing periods with the keyboard in this conventional elevated, horizontal orientation tends to be quite tiring for the computer user.

A critical design criteria for notebook computers is ultra-small size, particularly as to folded housing thickness since a primary advantage of the notebook computer is its ability to fit within a briefcase. Accordingly, the simple expedient of sloping the bottom side of the base housing to correspondingly slope the keyboard during use thereof is typically not employed since to do so would undesirably increase the thickness of the computer in its closed carrying configuration.

Moreover, it is not particularly desirable to provide the underside of the base housing with downwardly pivotable rear support legs because this would markedly reduce the overall stability of the computer during use. Thus, due to the fixed, elevated horizontal keyboard use orientation incorporated in conventional notebook and laptop computers, the users of such computers have heretofore been required to use a typing hand and wrist orientation appreciably less comfortable than that available when a desktop computer is being used.

One proposed method of attempting to provide a notebook computer keyboard with a typing comfort level approaching that of a sloping, separate desktop computer keyboard is to pivotally mount the notebook computer keyboard atop the base housing portion of the computer as shown in U.S. Pat. No. 5,168,427 to Clancy et al issued Dec. 1, 1992 and assigned to the assignee of the present application. The notebook computer keyboard illustrated and described in the Clancy et al patent is normally positioned in the usual elevated, generally horizontal typing position when the notebook computer is supported on a horizontal surface with its lid opened.

However, from its initial horizontal position atop the base housing portion the keyboard may be pivoted upwardly and releasably latched in a tilted use orientation in which the keyboard is still positioned atop the base housing portion, but tilts downwardly and forwardly toward the computer user, thereby emulating the sloping use orientation of a separate desktop computer keyboard. Despite this tilted use orientation of the pivotally adjusted notebook computer keyboard the keyboard is still elevated the usual one to two inches above the support surface upon which the opened notebook computer rests. Accordingly, hand and wrist fatigue can still easily set in after lengthy periods of keyboard use.

In view of this it is thus an object of the present invention to provide a compact portable computer, such as a laptop or notebook computer, with a keyboard portion that may be adjusted, relative to the balance of the computer, to a tilted use orientation having a typing comfort level more closely approximating that of the sloped separate keyboard of a desktop computer.

SUMMARY OF THE INVENTION

In carrying out principles of the present invention, in accordance with a preferred embodiment thereof, a specially designed portable computer, representatively a notebook computer, is provided which comprises a base housing having a bottom side restable on a generally horizontal support surface, a top side upwardly spaced apart and generally parallel to the bottom side, and a front side generally perpendicular to the top side. The portable computer also includes a keyboard structure having a body portion with a top side upon which a series of manually movable key elements are operable disposed.

To permit the keyboard to be conveniently used in a sloped orientation similar to that of the keyboard of a desktop computer, linkage means are provided for connecting the keyboard structure to the base housing. The linkage means are operative to permit selective translational and pivotal movement of the keyboard structure relative to the base housing between (1) a storage/transport and first use orientation in which the keyboard structure body portion is positioned on and generally parallel to the top side of the base housing with the key elements facing upwardly, and (2) a second use orientation in which the keyboard structure body portion is positioned generally forwardly of the base housing, and is sloped forwardly and downwardly relative thereto in a manner permitting a front portion of the keyboard structure body portion to be rested on the support surface.

In accordance with a feature of the invention, an opening is formed in the top side of the base housing and permits access to the interior thereof. When the keyboard structure is in its storage/transport and first use orientation, the keyboard structure extends across and covers the top side opening. However, when the keyboard structure is in its second use orientation it uncovers the top side opening and permits convenient access therethrough to the interior of the base housing and the various computer components operatively disposed therein.

DETAILED DESCRIPTION

Figure 1:
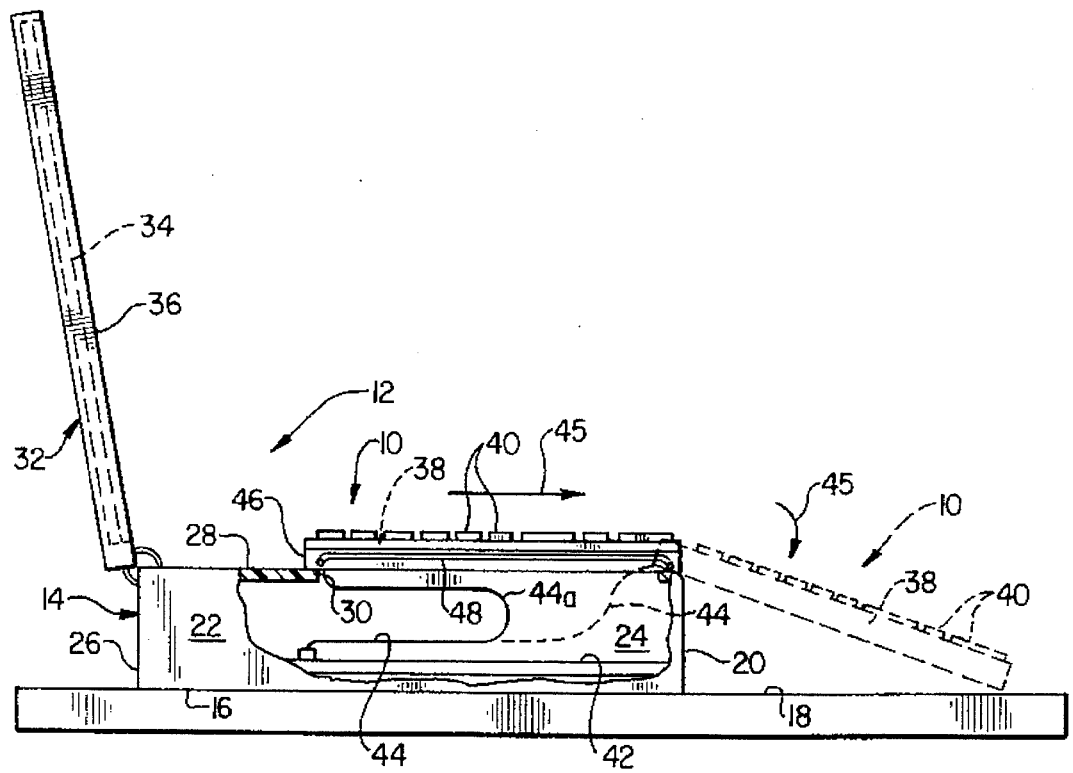
FIG. 1 is a partially cut away simplified side elevational view of a notebook computer having incorporated therein a pivotable keyboard structure embodying principles of the present invention, and illustrates in phantom, a tilted use orientation of the keyboard.
Figure 2A:
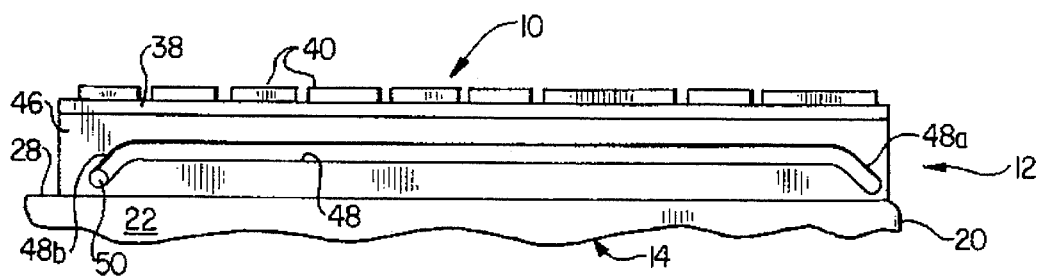
FIGS. 2A and 2B are enlarged simplified side elevational views of the support structure which permits the translational and pivotal keyboard movement illustrated in FIG. 1.
Figure 2B:
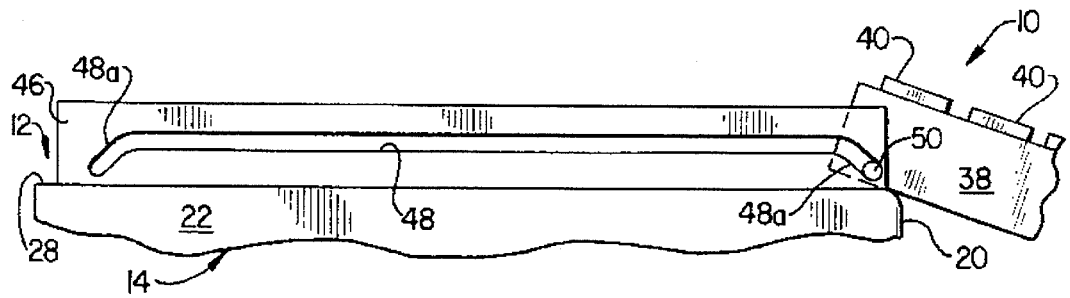

Referring initially to FIGS. 1–2B, in a preferred embodiment thereof the present invention incorporates a uniquely positionable keyboard structure 10 in a compact portable computer such as the representatively illustrated laptop or notebook computer 12. The computer includes a relatively thin rectangular base housing 14 formed from a molded plastic material. Base housing 14 has a bottom wall 16 adapted to rest upon a suitable horizontal support surface 18; an upstanding front wall 20; upstanding left and right side walls 22,24 extending rearwardly from the opposite ends of front wall 20; an upstanding rear wall 26; and a top wall 28 with an opening 30 therein that extends rearwardly from adjacent the front wall 20 to a location forwardly spaced apart from the rear wall 26.

A relatively thin rectangular plastic lid housing 32 is conventionally secured to the rear side of the base housing 14 in a manner permitting the lid housing to be pivoted between its illustrated upright use position (see FIG. 1) and a lowered storage/transport position (not shown) in which the lid housing 32 extends across and covers the top side of the base housing 14. The lid housing 32 carries a monitor structure having a display screen portion 34 extending across the front side 36 of the lid housing and visible to the computer user when the lid housing 32 is in its illustrated upwardly pivoted use position.

The keyboard structure 10 has a rectangular body portion 38 with a series of manually depressible keys 40 operatively disposed on the top side thereof. As best illustrated in FIG. 1, the keyboard structure 10 is linked to the base housing 14 in a manner permitting the keyboard (with the lid housing 32 in its opened position) to be moved between a solid line storage/transport and first use orientation, and a dotted line second use orientation. A motherboard 42 is mounted in a bottom portion of the base housing 14, in a parallel relationship with its bottom wall 16, and is electrically coupled to a rear side portion of the keyboard body 38 by a flexible ribbon cable 44 having a service loop section 44a that permits the movement of the keyboard structure between its solid and dotted line positions relative to the base housing.

In its storage/transport and first use orientation the keyboard 10 is positioned on the top side of the base housing 14 and extends across the opening 30 in the top wall 28. When the lid housing 32 is closed it covers and protects the keyboard 10 in this orientation. Upon subsequently opening the lid housing 32 the keyboard 10 is initially exposed in this horizontal, elevated orientation and may be used in a conventional manner and portable computer keyboard orientation. Alternately, as indicated by the arrows 45 in FIG. 1, the keyboard 10 may be forwardly translated and downwardly pivoted relative to the base housing 14 to its second use orientation, shown in dotted lines in FIG. 1, in which a forward edge portion of the forwardly and downwardly tilted keyboard body 38 rests on the support surface 18.

The linkage means that connect the keyboard 10 to the base housing 14 and permit the indicated manual translational and pivotal movement of the keyboard relative to the base housing between the solid and dotted line positions of the keyboard representatively include a pair of upstanding support brackets 46 longitudinally extending along top side edge portions of the base housing side walls 22 and 24 and having horizontally elongated slots 48 formed therein. As illustrated, the slots 48 each have downturned front and rear detent portions 48a,48b therein. The keyboard body 38 is captively retained on the brackets 46 by means of a pair of transverse mounting pin structures 50 formed on opposite lower rear side portions of the keyboard body 38 and slidingly received in the bracket slots 48.

As illustrated in FIG. 2A, with the keyboard 10 in its storage/transport and first use orientation, the keyboard body pins 50 are received in the rear detent portions 48b of the bracket slots 48, thereby restraining undesirable front-to-rear movement of the keyboard 10 relative to the base housing 14. As illustrated in FIG. 2B, with the keyboard 10 in its second use orientation, the keyboard body pins 50 are received in the front detent portions 48a of the brackets 48, thereby similarly restraining undesirable front-to-rear movement of the keyboard 10.

In its second use orientation shown in FIG. 2B, and in phantom in FIG. 1, the keyboard 10 elevationally and positionally emulates a desktop computer keyboard unit. It also conveniently uncovers the top side opening 30 in the base housing portion 14 to permit easy service and inspection access to the motherboard 42 and other components disposed within the interior of the base housing 14.

When it is desired to close and transport the computer 10, the forwardly and downwardly tilted keyboard 10 is simply lifted slightly to move the pins 50 out of the front slot detent portions 48a, pivoted to a horizontal orientation, and then rearwardly translated to its FIG. 1 solid line position in which the pins 50 drop into the rear bracket slot detent portions 48b. The lid 32 may then be closed over the keyboard 10 and appropriately latched to the base housing 14.

Figure 3A:
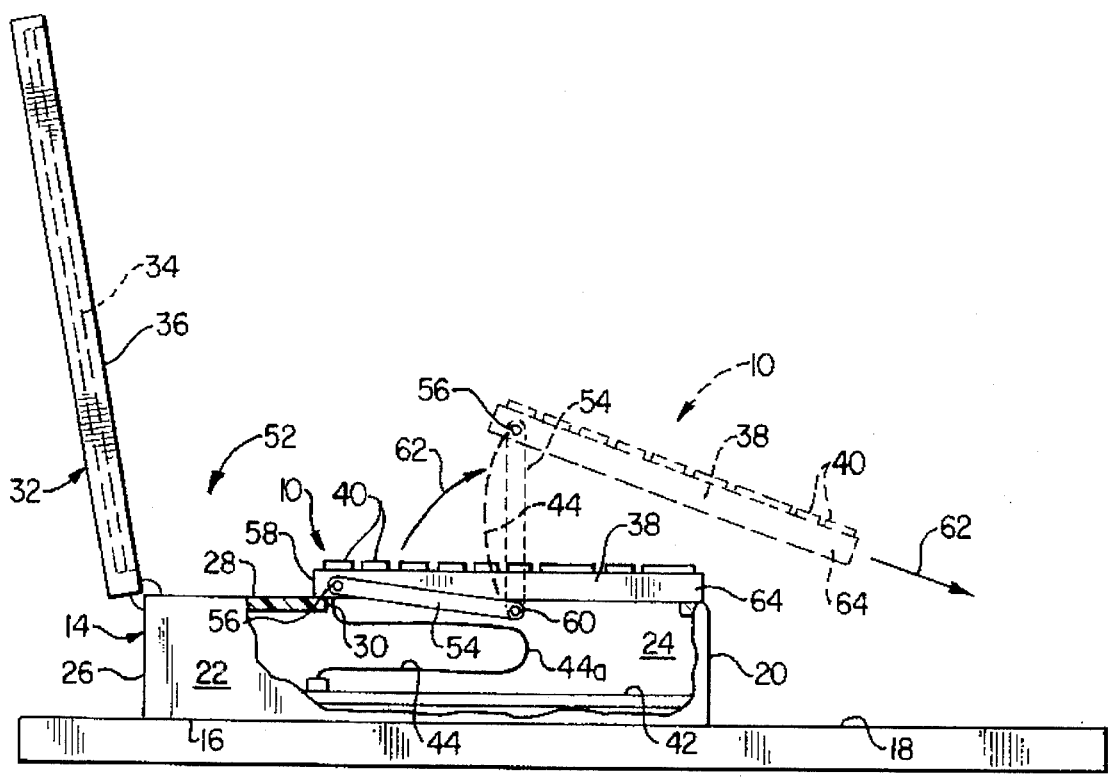
FIGS. 3A–3C are partially cut away simplified side elevational views of a notebook computer having an alternate embodiment of the pivotable keyboard structure incorporated therein and illustrate the pivotal movement of the alternate keyboard structure.
Figure 3B:
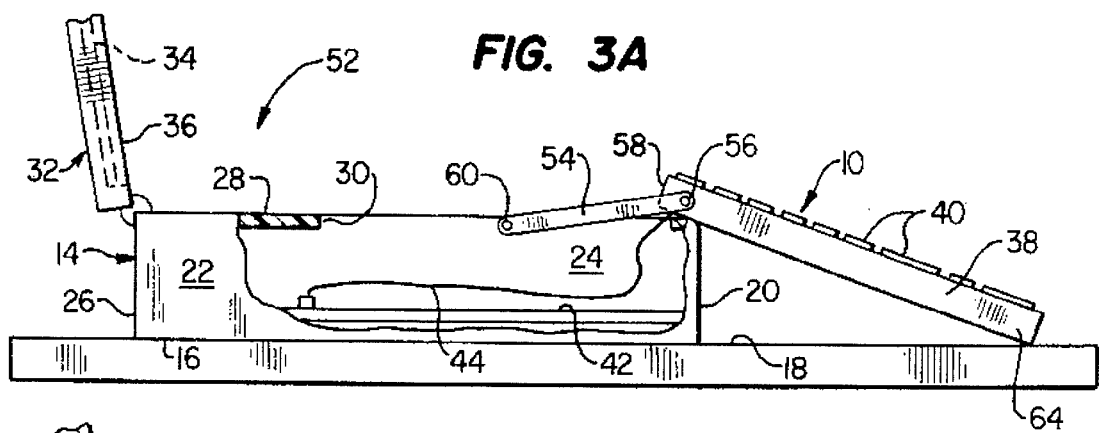

An alternate embodiment 52 of the previously described computer 12 is illustrated in FIGS. 3A and 3B and is identical to the computer 12 with the exception of the linkage means that movably couple the keyboard structure 10 to the base housing 14 and permit the keyboard to be selectively and manually moved relative to the base housing between its FIG. 3A storage/transport and first use orientation and its FIG. 3B tilted second use orientation.

In the computer 52 these linkage means include a pair of elongated pivot bars 54 positioned on opposite sides of the base housing 14. First ends of the bars 54 are pivotally secured at points 56 to the opposite sides of the keyboard body 38 at a rear end portion 58 thereof, and the opposite ends of the bars 54 are pivotally secured at points 60 to the opposite side walls 22,24 of the base housing 14. With the keyboard structure 10 in its FIG. 3A storage/transport and first use orientation the pivot points 56 are positioned rearwardly of the pivot points 60.

To manually move the keyboard structure 10 from its FIG. 3A position to its second use orientation shown in FIG. 3B, the keyboard 10 is lifted, forwardly translated and downwardly pivoted as indicated by the directional arrows 62, and the dotted line position of the keyboard 10, in FIG. 3A. This movement pivots the bars 54 in a clockwise direction, as may be seen by comparing FIGS. 3A and 3B, and positions the keyboard 10 in its second use orientation (FIG. 3B) in which the rear end portion 58 of the keyboard body 38 rests on a front edge portion of the base housing 14, and a front end portion of the keyboard body 38 rests on the support surface 18. To return the keyboard to its storage/transport and first use orientation the keyboard is simply lifted and moved through its FIG. 3A dotted line position to its FIG. 3A solid line position.

Figure 3C:
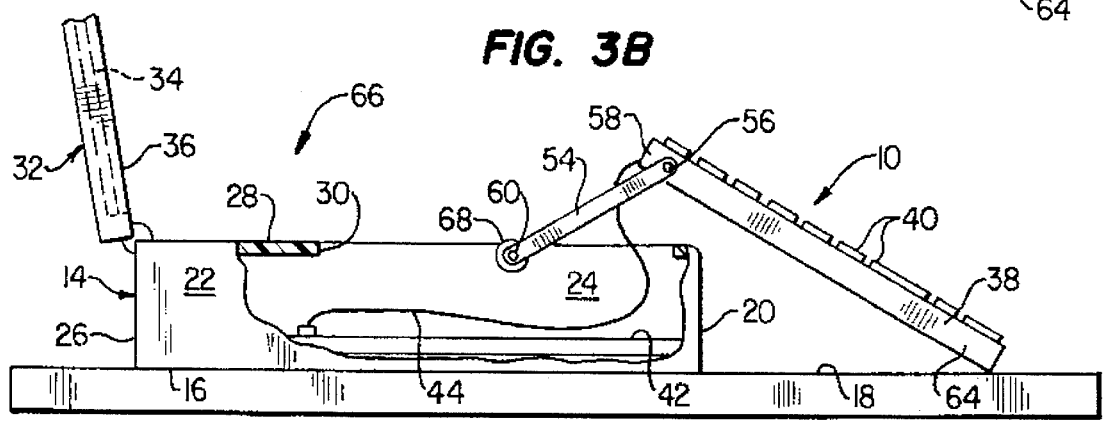

A second alternate embodiment 66 of the computer 12 is illustrated in FIG. 3C. Computer 66 is identical to the previously described computer 52 with the exception that small friction locking wheels 68 are connected to the ends of the bars 54 which are pivoted at points 60 to the base housing side walls 22 and 24. The locking wheels 68 may be selectively tightened to hold the keyboard 12 in its second use orientation at a slope angle greater than that shown in FIG. 3B by releasably preventing rotation of the bars 54 past their FIG. 3C angular orientations. In this manner, the rear end portion 58 of the keyboard body 38 may be supported in an upwardly spaced relationship with the front end of the base housing, while the front end portion 64 of the keyboard body 38 rests on the support surface 18, to selectively increase the operational slope angle of the keyboard structure 12.

The foregoing detailed description is to be clearly understood as being given by way of illustration and example only, the spirit and scope of the present invention being limited solely by the appended claims.

What is claimed is:

1. A portable computer comprising:

a base housing having a bottom side restable on a generally horizontal support surface, a top side upwardly spaced apart from and disposed generally parallel to said bottom side, and a front side generally perpendicular to said top side;

a keyboard structure having a body portion with a top side upon which a series of manually movable key elements are operably disposed; and linkage means for connecting said keyboard structure to said base housing for selective translational and pivotal movement relative thereto between:

(1) a storage/transport and first use orientation in which said keyboard structure body portion is positioned on and generally parallel to said top side of said base housing with said key elements facing upwardly, and (2) a second use orientation in which said keyboard structure body portion is positioned generally forwardly of said base housing, and is sloped forwardly and downwardly relative thereto in a manner permitting a front portion of said keyboard structure body portion to be rested on the support surface, said base housing having first and second opposite, parallel sides each extending perpendicularly to said top, front and bottom sides of said base housing, and said linkage means including:

first and second spaced apart elongated support brackets positioned on said top side of said base housing and longitudinally extending parallel to said first and second sides of said base housing, said first and second support brackets having elongated slots formed therein and extending parallel to their lengths, and a pair of pin structures secured to opposite sides of said keyboard structure body portion and captively retained in said slots for movement along the lengths thereof.

2. The portable computer of claim 1 wherein:

said portable computer is a notebook computer.

3. The portable computer of claim 1 wherein:

said top side of said base housing has an opening therein through which the interior of said base housing outwardly opens, said keyboard structure, in said storage/transport and first use orientation thereof, covers said opening, and said keyboard structure, in said second use orientation thereof, uncovers said opening to permit access therethrough to the interior of said base housing.

4. The portable computer of claim 1 wherein:

each of said slots has downturned opposite end portions that act as detents to restrain the movement of said pin structures parallel to the lengths of said slots when said pin structures are received in said slot end portions.

5. A notebook computer comprising:

a base housing having a bottom side restable on a generally horizontal support surface, a top side upwardly spaced apart from and disposed generally parallel to said bottom side, a front side generally perpendicular to said top side, and an opening in said top side through which the interior of said base housing outwardly extends;

a lid housing secured to a rear side portion of said base housing for pivotal movement relative to said base housing between a closed position in which said lid housing extends across and parallel to said top side of said base housing, and an open position in which said lid housing extends upwardly from said base housing at an angle to said top side thereof;

a keyboard structure having a body portion with a top side upon which a series of manually movable key elements are operably disposed; and linkage means for connecting said keyboard structure to said base housing for selective translational and pivotal movement relative thereto, with said lid housing in said open position thereof, between:

(1) a storage/transport and first use orientation in which said keyboard structure body portion is positioned on and generally parallel to said top side of said base housing with said key elements facing upwardly, and said keyboard structure body portion covering said opening in said top side of said base housing, and (2) a second use orientation in which said keyboard structure body portion is positioned generally forwardly of said base housing, is sloped forwardly and downwardly relative thereto in a manner permitting a front portion of said keyboard structure body portion to be rested on the support surface, and uncovers said opening in said top side of said base housing, said base housing having first and second opposite, parallel sides each extending perpendicularly to said top, front and bottom sides of said base housing, and said linkage means including:

first and second spaced apart elongated support brackets positioned on said top side of said base housing and longitudinally extending parallel to said first and second sides of said base housing, said first and second support brackets having elongated slots formed therein and extending parallel to their lengths, and a pair of pin structures secured to opposite sides of said keyboard structure body portion and captively retained in said slots for movement along the lengths thereof.

6. The portable computer of claim 5 wherein:

each of said slots has downturned opposite end portions that act as detents to restrain the movement of said pin structures parallel to the lengths of said slots when said pin structures are received in said slot end portions.

* * * * *